United States Patent
Debail

(10) Patent No.: US 6,718,041 B2
(45) Date of Patent: Apr. 6, 2004

(54) ECHO ATTENUATING METHOD AND DEVICE

(75) Inventor: Bernard Debail, Pleumeur Bodou (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/148,550

(22) PCT Filed: Sep. 24, 2001

(86) PCT No.: PCT/FR01/02957
§ 371 (c)(1),
(2), (4) Date: Oct. 29, 2002

(87) PCT Pub. No.: WO02/30099
PCT Pub. Date: Apr. 11, 2002

(65) Prior Publication Data
US 2003/0105540 A1 Jun. 5, 2003

(30) Foreign Application Priority Data

Oct. 3, 2000 (FR) .............................................. 00 12618
Jul. 20, 2001 (FR) .............................................. 01 09781

(51) Int. Cl.[7] .............................. H04B 3/20; H04M 9/08
(52) U.S. Cl. ................ 381/66; 379/406.02; 379/406.03
(58) Field of Search ............................. 381/66, 71.12, 381/94.1, 92; 379/406.01, 406.02, 406.03, 406.06, 406.08, 406.12, 406.14, 406.15

(56) References Cited

U.S. PATENT DOCUMENTS

| | | | |
|---|---|---|---|
| 5,222,251 A | * 6/1993 | Roney et al. | ................ 455/570 |
| 5,313,498 A | * 5/1994 | Sano | ........................ 375/350 |
| 5,808,913 A | * 9/1998 | Choi et al. | ................... 702/191 |
| 5,818,945 A | * 10/1998 | Makino et al. | ............... 381/66 |
| 6,041,127 A | * 3/2000 | Elko | ............................ 381/92 |
| 6,462,709 B1 | * 10/2002 | Choi | ........................... 342/378 |
| 6,549,627 B1 | * 4/2003 | Rasmusson et al. | ..... 381/71.11 |

FOREIGN PATENT DOCUMENTS

| | | | |
|---|---|---|---|
| EP | 0 503 660 | 9/1992 | ............ 379/406.08 |

OTHER PUBLICATIONS

Kellerman W, "Strategies for combining acoustic echo cancellation and adaptive beamforming microphone arrays", Acoustics, Speech, and Signal Processing, 1197. ICASSP–97, 1997 IEEE International Conference in Munich, Germany Apr. 21–24, 1997, Los Alamitos, CA, USA, IEEE Comput. Soc, US, pp. 219–222.

Dahl M., et al., "Acoustic Noise and Echo Canceling with Microphone Array", IEEE Transactions on Vehicular Technology, IEEE Inc., New York, US. vol. 48, No. 5, Sep. 1999 pp. 1518–1526.

Arikawa T. et al., "Evolution of computer–human interface design for the personal multimedia desktop conference system", Proceedings of the International Conference on Communications (ICC). Geneva, May 23–26, 1993, New York, IEEE, US. vol. 3, May 23, 1993 pp. 1172–1176.

* cited by examiner

*Primary Examiner*—Xu Mei
(74) *Attorney, Agent, or Firm*—Cohen, Pontani, Lieberman & Pavane

(57) ABSTRACT

The present invention relates to an echo reduction method implemented with a multi-sensor sound pickup device (8) forming an antenna (10), and a sound playback device (13). The method consists in subjecting the output signals $y_m(t)$ from the sensors ($11_m$) to complex weights w(f), said weights w(f) being calculated by maximizing the directivity factor $F_d(f)$ under constraints at low frequencies and in the near field. The invention also provides an echo reduction apparatus (6). The apparatus comprises: a multi-sensor sound pickup device (8) forming an antenna (10); means for calculating a first constraint; and means for calculating a second constraint.

8 Claims, 3 Drawing Sheets

ECHO ATTENUATING METHOD AND DEVICE

This application is a U.S. National Phase Application under 35 USC 371 of International Application PCT/FR01/02957 (not published in English) filed Sep. 24, 2001.

Field of the Invention

The invention relates to the field of acoustics in air and it applies in particular to systems for wiring halls and rooms for sound.

The present invention relates to an echo reduction method implemented with a multi-sensor sound pickup device constituting an antenna and a sound playback device. The invention also relates to echo reduction apparatus designed to operate with a sound playback device to implement the method of the invention. The frequency domain to which the invention applies is the speech domain and more particularly that of low frequency speech signals.

Description of the Prior Art

A most advantageous application of the invention lies in reducing the echo in a sound pickup device in a teleconferencing system, thereby making so-called "hands-free" communication possible without needing to use an offset microphone.

Acoustic echo is a major obstacle to proper operation of hand-free communications terminals. This acoustic echo is the result of the sensors of the sound pickup device capturing a portion of the signal emitted by the transducers of the sound playback device. The sensors and the transducers used for acoustics in air are respectively microphones and loudspeakers.

In a hands-free communications terminal, microphones are acoustically coupled, and possibly also mechanically coupled, with the sound playback system, either directly when the microphones and the playback system are in the same housing, or else indirectly as is the case for a video conference terminal placed on a TV monitor. The resulting echo comprises two portions:

the room response; and
direct coupling between the loudspeaker and the microphone.

The response of the room can generally be processed effectively by conventional echo controlling techniques such as echo cancelling or gain variation, and in particular because of the relatively low level of this portion of the echo. The same does not apply to the direct coupling which results both from the sound path through the air and also from vibration propagating through the shell of the communications terminal, and possibly also from any resonances of cavities or mechanical elements when set top boxes are used. This portion of the echo is generally at a level which is 6 dB to 20 dB higher than the level of the local speech picked up by the microphones, and it gives rise to a "howl-around" effect unless processing is applied.

If known echo cancelling techniques do not enable this unwanted effect to be processed in satisfactory manner, then a large variation in gain must be applied in order to prevent howl-around starting. This variation in gain must apply firstly during the stage in which the echo canceller is converging and secondly following any variation in the echo path or during moments of double talking. Because of this constraint, the communications terminal is not very interactive and the user can have the feeling that the hands-free function does not work well.

To mitigate that drawback, there exists several techniques for reducing direct coupling.

A first technique sets out to reduce mechanical coupling. The solution normally applied consists in using damping materials such as foams or rubber to isolate the microphone from the shell. Those materials have the effects of eliminating or greatly reducing loudspeaker-generated vibration in the shell, and also propagation thereof to the microphone.

The mechanical decoupling solution is effective in reducing coupling by vibration, but industrially speaking it is expensive. Furthermore, it does not reduce the acoustic coupling that can be large if the microphone is placed close to the loudspeaker, as is the present trend because of the desire for communications terminals to be small in size. Furthermore, when the playback system forms an integral portion of an assembly that also includes the sound pickup device, as is the case of a television monitor including loudspeakers and microphones or of a monitor having placed thereon a device that includes microphones, it is not possible to envisage isolating the loudspeakers from the shell of the assembly.

A second technique consists in using a digital compensation filter whose response is obtained by calculating the inverse of the impulse response of the mechanical and acoustic coupling between the microphone and the loudspeaker.

In theory, the signal from the loudspeaker due to the echo is cancelled from the output of the compensation filter. In practice, that technique does not give satisfaction the characteristics of the coupling change, even if only to a very small extent, for example due to the communications terminal being assembled and/or disassembled or due to a change in the characteristics of the microphones. Furthermore, that technique is unsuitable if the disturbances are of a non linear nature, i.e. if the disturbances cannot be modelled by a convolution product between the signal coming from the loudspeaker and a filter impulse response. Furthermore, the behavior of transducers is rarely linear, since they are generally subject to distortion and/or to saturation, both of which are typical examples of non-linear operation. Finally, in mass production, coupling is necessarily different from one communications terminal to another, for example because the loudspeakers and microphones that are used differ slightly from one another. Finally, those limitations make the filter compensation technique relatively ineffective.

Other systems exist for weighting microphones based on uniformly distributing microphones around a loudspeaker and amplitude-weighting the microphones and/or phase-shifting the microphones. Such systems constitute the subject matter of French patent No. 93/020504. Those systems are for use in group communications terminals possessing unusual geometrical symmetry due to the way they pick up sound omnidirectionally. The effectiveness of those systems is highly sensitive to mismatches between the microphones or the acquisition channels. Consequently, those systems require components to be sorted and microphones to be calibrated accurately, and such matching can become lost over time. In addition, adding a display screen, a keypad, or a swivel-mounted camera can break the symmetry between the loudspeakers and the microphones. Furthermore, when the number N of microphones exceeds two, such devices are not optimal since N degrees of freedom are available for satisfying two constraints, namely fixing gain in a given direction and cancelling direct coupling. Finally, since the signal as picked up corresponds to all of the contributions from each of the microphones and not only the contribution from the wanted source, and since these contributions are mutually phase-shifted and possibly of different amplitudes, the spectrum of the resulting signal is degraded at high frequencies.

Another system intended more for individual applications, as disclosed in French patent No. 98/14321 for example, offers the advantage of taking account of the specific features of the final terminal, i.e. of the communications terminal after the system has been integrated therein. That system makes use of two microphones positioned at different distances from the loudspeaker. The contributions from the two microphones are combined by weighting so as to cancel the direct coupling wave. The different weightings of the two signals coming from the two microphones make it possible to pick up useful sources situated in a far field. The path filter applied to the second microphone can be calculated by inverting the response of a measurement of the coupling between the microphone and the loudspeaker. Such calculation is generally sufficient in most situations since the microphones are in the direct field of the loudspeaker. Nevertheless, that solution requires there to be an amplitude difference of sufficient magnitude in the coupling waves between the two microphones. To obtain such a difference, it is necessary to position the microphones sufficiently close to the loudspeaker which gives rise to conditions that are very unfavorable in terms of coupling. Although that condition is not troublesome for an individual system in which said disposition is unavoidable, the same does not apply to any systems such as video conference terminals of the set top box type, i.e. terminals of a shape suitable for placing on a TV monitor. In that configuration, the further the microphones are away from the loudspeaker, the greater the spacing necessary between the sensors. That puts a limit on passband and increases sensitivity to obstacles situated nearby. Finally, there can be amplification of incoherent noise which can be controlled only by changing the distance between the two microphones.

Finally, the directivity of those devices is controllable to some extent only and is little different from the directivity specific to the microphones.

In parallel with those solutions, there exist multi-sensor techniques which seek to guard against acoustic coupling by making the system directional overall. When the sound source is situated in a noisy or reverberating environment, the directivity of a single sensor can be insufficient for extracting signal from noise.

To remedy that problem, one method consists in associating N sensors to form an acoustic antenna. The association consists in adding the signals output from the various sensors in phase coherence for a given direction ($\phi$, $\theta$). Such addition constitutes one of the techniques known as "channel-forming". A sensor or a transducer is characterized by its directivity in three dimensions which is usually measured in two orthogonal planes and is represented in polar coordinates (r, $\phi$, $\theta$) in the form of two radiation patterns. The directivity of a sensor gives an "image" of the level at which a signal will be picked up by the sensor from a point sound source situated in a direction ($\phi$, $\theta$) and at a distance r from the center of the sensor. The directivity of the antenna obtained after channel-forming presents performance that is better than the directivity of a single sensor. The N microphones which are separated from one another by a distance d pick up the pressure of a localized volume and thus perform spatial sampling of the sound field. This method provides good effectiveness at high frequencies, but at low frequencies (f<1000 Hz), the difficulty remains, for several reasons:

lack of directivity due to the small size of the antenna;

less robustness because of the high sensitivity at low frequencies to disparities between sensors, because of the effect of the TV screen, if any; and the antenna has a directional radiation pattern for a source situated at the location of the loudspeakers that is different from its directional radiation pattern at 3 meters (m) since the loudspeakers are not located in the far field.

Thus, an object of the invention is to reduce the echo produced by acoustic coupling between the sound pickup device and the sound playback device without the drawbacks of known methods and apparatuses.

SUMMARY OF THE INVENTION

To this end, the invention provides an echo reduction method implemented with a multi-sensor sound pickup device forming an antenna and a sound playback device, the method consists in submitting the output signals from the sensors to complex weights w(f), said weights w(f) being calculated by maximizing the directivity factor $F_d(f)$ under low frequency and near field constraints, where the expression for the directivity factor is as follows:

$$F_d(f) = \frac{1}{\frac{1}{4\pi} w^H(f) D_r(f) w(f)} \quad (1)$$

with (2)

$$D_r(f) = \int_{\theta=0}^{\pi} \int_{\varphi=0}^{2\pi} W(f, \varphi, \theta) H(f, r, \varphi, \theta) H^H(f, r, \varphi, \theta) \sin\theta d\theta d\varphi$$

the calculation being such that said weights w(f) satisfy a linear first constraint (3) on the modulus and the phase of the transfer function of the sound pickup device in given directions, the formulation of this first constraint at each frequency f being as follows:

$$C^H(f)w(f)=s(f) \quad (3)$$

said method being characterized in that in addition said weights w(f) are calculated in such a manner as to satisfy a second constraint (4) determined on the basis of in-situ measurements of complex transfer functions of sound channels defined by the inputs of the loudspeakers of the sound playback device and the outputs of the sensors making up the sound pickup device, this second constraint at each frequency f being formulated as follows:

$$M^H(f)w(f)=0 \quad (4)$$

where formulas (1) and (4) are such that:

H is the propagation vector whose elements are the complex values of the free field transfer functions between a point source situated at the distance r from the center of the antenna in the direction defined by polar angles $\phi$ and $\theta$, and each sensor of the antenna, as calculated at the frequency f;

$D_r(f)$ is the directivity matrix which characterizes the spatial selectivity properties of the antenna at distance r;

W(f, $\phi$, $\theta$) are spatial weights that enable waves coming from the loudspeaker directions to be attenuated to a greater extent in order to reduce direct coupling with the loudspeakers;

w(f) is a vector of complex weights for the output signals from the sensors at the frequency f;

C(f) is a "constraint" matrix containing the theoretical propagation vectors calculated on the basis of a free field type propagation model or as measured under free field conditions;

s(f) are the desired complex gains in the given directions;

M(f) is a coupling constraint matrix containing the complex transfer functions as measured in-situ of the sound channels defined by the inputs to the loudspeakers of the sound playback device and by the outputs from the sensors making up the sound pickup device, referred to as "sound coupling" channels; and 0 is a zero vector.

Thus, the invention takes account of constraints on direct coupling when calculating channel formation. The channel-forming calculation is not performed solely on the basis of theoretical propagation models or of measurements performed in a quiet room, but also on the basis of estimated transfer functions obtained on site. Thus, the invention makes it possible to reduce direct and/or semi-direct coupling while imposing desired directivity and while controlling the maximum amplification of incoherent noise.

The invention applies in particular to sound pickup devices for group video conferences.

The invention has the advantage of taking account automatically of the near acoustic environment (shape of the TV monitor and of the box containing the antenna, position of the box relative to the monitor, the presence of an obstacle or a wall nearby), the response of the loudspeakers, and the mismatch between the pickups. In addition, since optimization is performed blind, the method of the invention does not require prior assumptions to be made concerning knowledge about the positions of the loudspeakers, and concerning the electro-acoustic characteristics of the loudspeakers and of the sensors.

BRIEF DESCRIPTION OF THE DRAWINGS

Other characteristics and advantages of the invention appear from the following description made with reference to the accompanying figures given as non-limiting examples.

FIG. 3 is a flow chart of a second implementation of a method of the invention.

DETAILED DESCRIPTION OF AN EMBODIMENT

Figure 1:
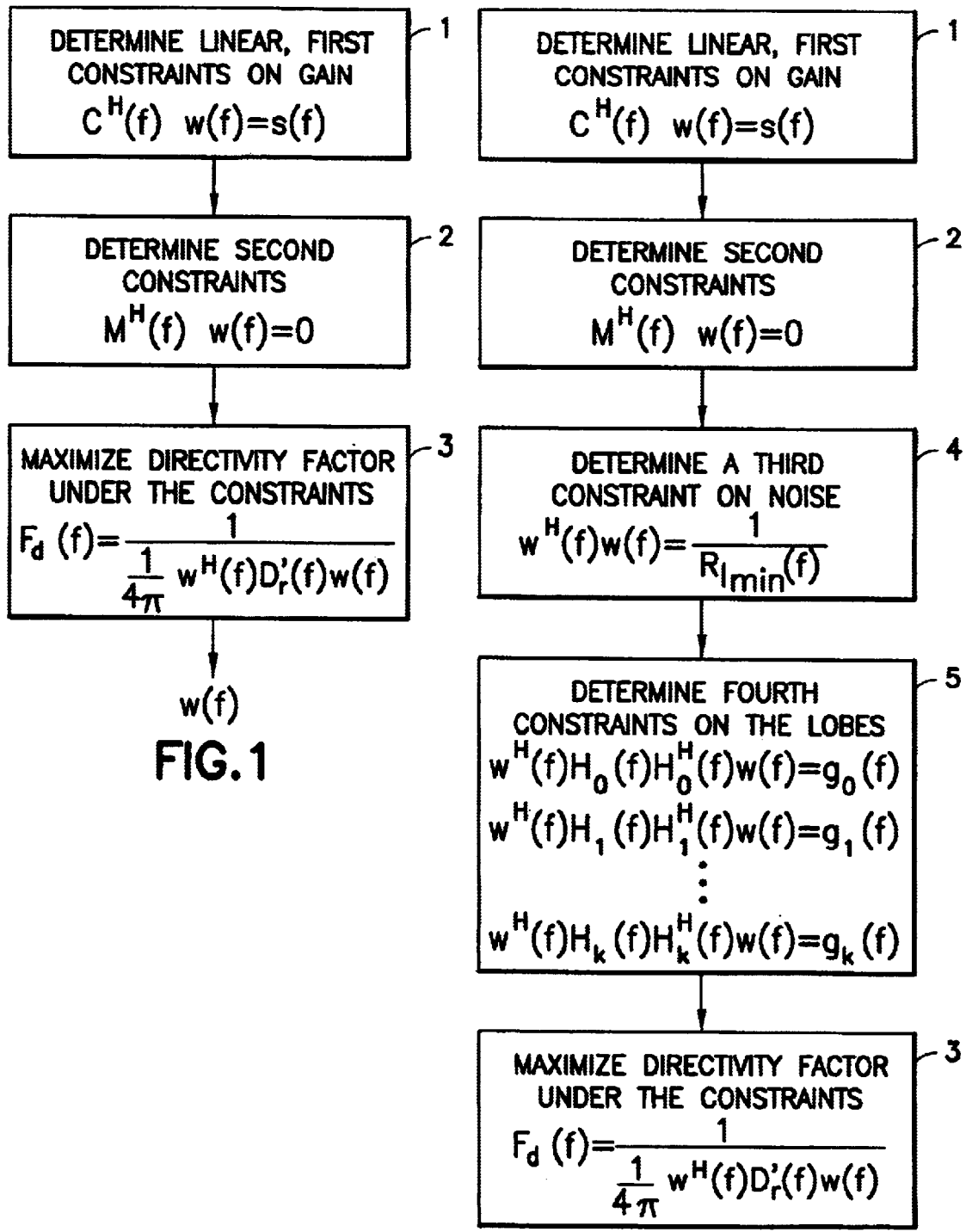
FIG. 1 is a flow chart of a first implementation of a method of the invention.

The echo reducing method of the invention is implemented with a multi-sensor sound pickup device forming an antenna and a sound playback device. The method of the invention consists in subjecting the output signals from the sensors of the sound pickup device to complex weights w(f), said weights being calculated by maximizing the directivity factor $F_d(f)$ under constraints at low frequencies and in the near field. The method takes place in several steps as described below and shown in FIG. 1.

In a first step 1, the method of the invention consists in determining the expression for the linear first constraint (3) of desired gain in the far field in directions corresponding to the useful sources (speakers), as defined by the matrix equation:

$$C^H(f)w(f)=s(f) \qquad (3)$$

in which equation:

C(f) is the "constraint" matrix containing the theoretical propagation vectors calculated on the basis of a propagation model of the free field type or as measured under free field conditions;

w(f) is a vector of complex weights for the output signals from the sensors at the frequency f; and s(f) are the desired complex gains in given directions.

In a second step 2, the method of the invention consists in determining the expression for the second constraint (4) determined from on-site measurements of the complex transfer functions of acoustic channels defined by the inputs of the loudspeakers of the sound playback device and by the outputs of the sensors making up the sound pickup device, this constraint being defined by the following matrix equation:

$$M^H(f)w(f)=0 \qquad (4)$$

in which equation:

M(f) is a coupling constraint matrix containing the complex transfer functions measured on site for the acoustic channels defined by the inputs of the loudspeakers of the sound playback device and by the outputs of the sensors making up the sound pickup device; and 0 is a zero vector.

In a third step 3, the method of the invention consists in maximizing the directivity factor (1) in the near field.

Figure 2:
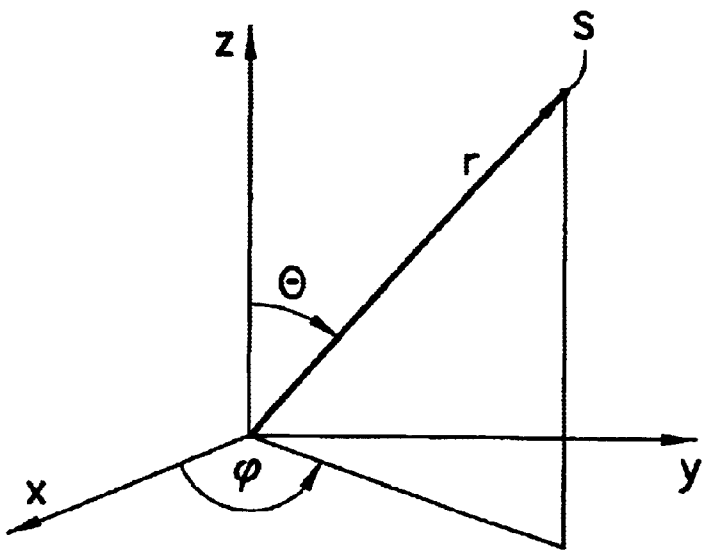
FIG. 2 shows a frame of reference in polar coordinates.

The near field directivity factor $F_d$ is defined by the following equation:

$$F_d(f) = \frac{1}{\frac{1}{4\pi}w^H(f)D_r(f)w(f)} \qquad (1)$$

with $$D_r(f) = \int_{\theta=0}^{\pi}\int_{\varphi=0}^{2\pi} W(f,\varphi,\theta)H(f,r,\varphi,\theta)H^H(f,r,\varphi,\theta)\sin\theta d\theta d\varphi \qquad (2)$$

in which equations:

H is the propagation vector whose elements are the complex values of the free field transfer functions between a point source S, shown in FIG. 2 and situated at the distance r from the center of the antenna in the direction defined by the polar angles $\phi$ and $\theta$, and each of the sensors of the antenna, as calculated at the frequency f;

$D_r(f)$ is the "directivity matrix" which characterizes the spatial selectivity properties of the antenna at distance r; and W(f, $\phi$, $\theta$) are spatial weights that enable waves coming from the loudspeaker directions to be attenuated to a greater extent in order to reduce direct coupling with the loudspeakers.

While maximizing the directivity factor, the following constraints can also be taken into account on an optional basis when implementing the method, with a flow chart of the corresponding method being shown in FIG. 3:

a non-linear third constraint (4) concerning robustness in the face of incoherent noise whose value is fixed by the minimum reduction factor $R_{fmin}(f)$ in application of the following equation:

$$w(f)^H w(f) = \frac{1}{R_{l_{\min}}(f)} \tag{5}$$

non-linear fourth constraints (5) concerning the angular aperture of the main lobe and/or the amplitude gains in given directions, and concerning reduction of aliasing lobes and of secondary lobes. These constraints serve firstly to guarantee sufficient width of the main lobe of the antenna for proper coverage of the angular zone in which useful source directions are to be found, and in this sense they are additional to the linear constraint corresponding to equation (3). Secondly, they make it possible to keep microphones active at frequencies where the spacing between microphones is too large to satisfy the Shannon conditions, by limiting the levels of the resulting aliasing lobes and also by limiting the levels of the secondary lobes. These constraints thus make it possible to achieve better directivity factors, particularly in those frequency bands where some of the sensors go from the active state to the inactive state. This makes it possible to deploy a smaller number of sensors, thereby optimizing the cost of the apparatus. These constraints are expressed in the form of a system of non-linear equations:

$$w^H(f)H_0(f)H_0^H(f)w(f) = g_0(f) \tag{6}$$

$$w^H(f)H_1(f)H_1^H(f)w(f) = g_1(f)$$

$$\vdots$$

$$w^H(f)H_k(f)H_k^H(f)w(f) = g_k(f)$$

in which system of equations:

$H_i$, i=0, . . . , k represents the propagation vector between a point source in the far field in an angular direction ($\phi_i$, $\theta_i$) and the microphones of the antenna; and $g_i$ represents the gain that is desired in this direction. Thus, $g_0$ represents the desired gain, e.g. −3 dB, in the direction corresponding to the aperture of the main lobe, e.g. ±30° about the center thereof.

These various optional constraints are taken into account by modifying the expression for the directivity matrix using the following formula:

$$D'_r(f) = D_r(f) + \mu(f)I + \sum_{i=0}^{k} \alpha_i(f)H_i(f)H_i^H(f) \tag{7}$$

where $\mu(f)$ is the Lagrange coefficient which is adjusted to satisfy the robustness constraint (5), and $\alpha_i(f)$, i=0, . . . , k is a set of Lagrange coefficients adjusted to satisfy the non-linear constraints on the aperture of the main lobe and on reducing the aliasing lobes and the secondary lobes (6).

The optimum solution to the problem is given by the following formula:

$$w(f) = D'_r{}^{-1}(f)C(f)(C^H(f)D'_r{}^{-1}(f)C(f))^{-1}s(f) \tag{8}$$

Such optimization makes it possible to reduce the sensitivity of the antenna for near sources without significantly modifying the performance of the antenna in the far field.

Figure 4:
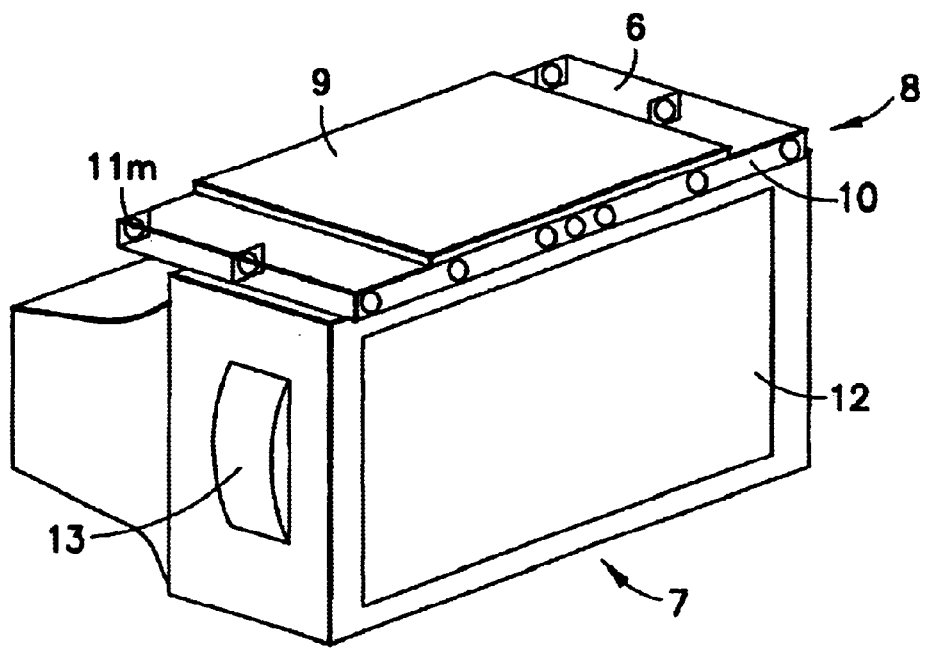
FIG. 4 is a perspective diagram showing a particular embodiment of echo reduction apparatus operating with an acoustic system for implementing a method of the invention.

The diagram of FIG. 4 shows an example of apparatus 6 for reducing echo which operates together with a sound system 7 for implementing a method of the invention.

The echo reduction apparatus 6 is in the form of a set top box. The box comprises both a device 8 for picking up sound from the air and an electronic calculation module 9. The airborne sound pickup device 8 consists in an antenna 10 formed in the example shown by the eleven microphones $11_m$ made visible in the diagram by making the box appear to be transparent, the microphones occupying three parallel planes with m=1, 2, . . . , N and N=11. The electronic calculation module 9 has calculation means for calculating the various constraints and, in particular the first constraint as expressed by equation (3) and the second constraint as expressed by equation (4). The calculation means are typically constituted by integrated signal processing circuits that perform calculations in real time. In a variant, they can be constituted by a general-purpose processor that is of sufficient speed, such as those now being integrated in advanced teleconferencing terminals.

The acoustic system 7 comprises a TV monitor 12 and a device 13 for playing back sound, which device is constituted by two loudspeakers disposed on either side of the TV monitor.

At low frequencies, because of high superdirectivity indices, and in spite of pointing towards a speaker situated in the far field, the loudspeaker 10 possesses increased sensitivity for sources situated in the near field. The loudspeakers constitute near sources as do sources constituted by images of the loudspeakers when the system 7 is located close to a wall. These reflections/scattering carry a large amount of energy because they are early. This effect is particularly marked in these frequency bands where soundwaves are subjected to little attenuation by absorption on reflecting surfaces.

To reduce the sensitivity of the antenna 10 to near sources without significantly altering the performance of the antenna 10 in the far field, the echo reduction apparatus 6 maximizes the near field directivity factor under constraints as defined by equation (1) using the method of the invention. In equation (2) the directions 0 and π, which correspond to the directions to the loudspeakers in the system 7, are weighted to a greater extent by the spatial weighting function w in such a manner as to minimize direct acoustic coupling.

Figure 5:
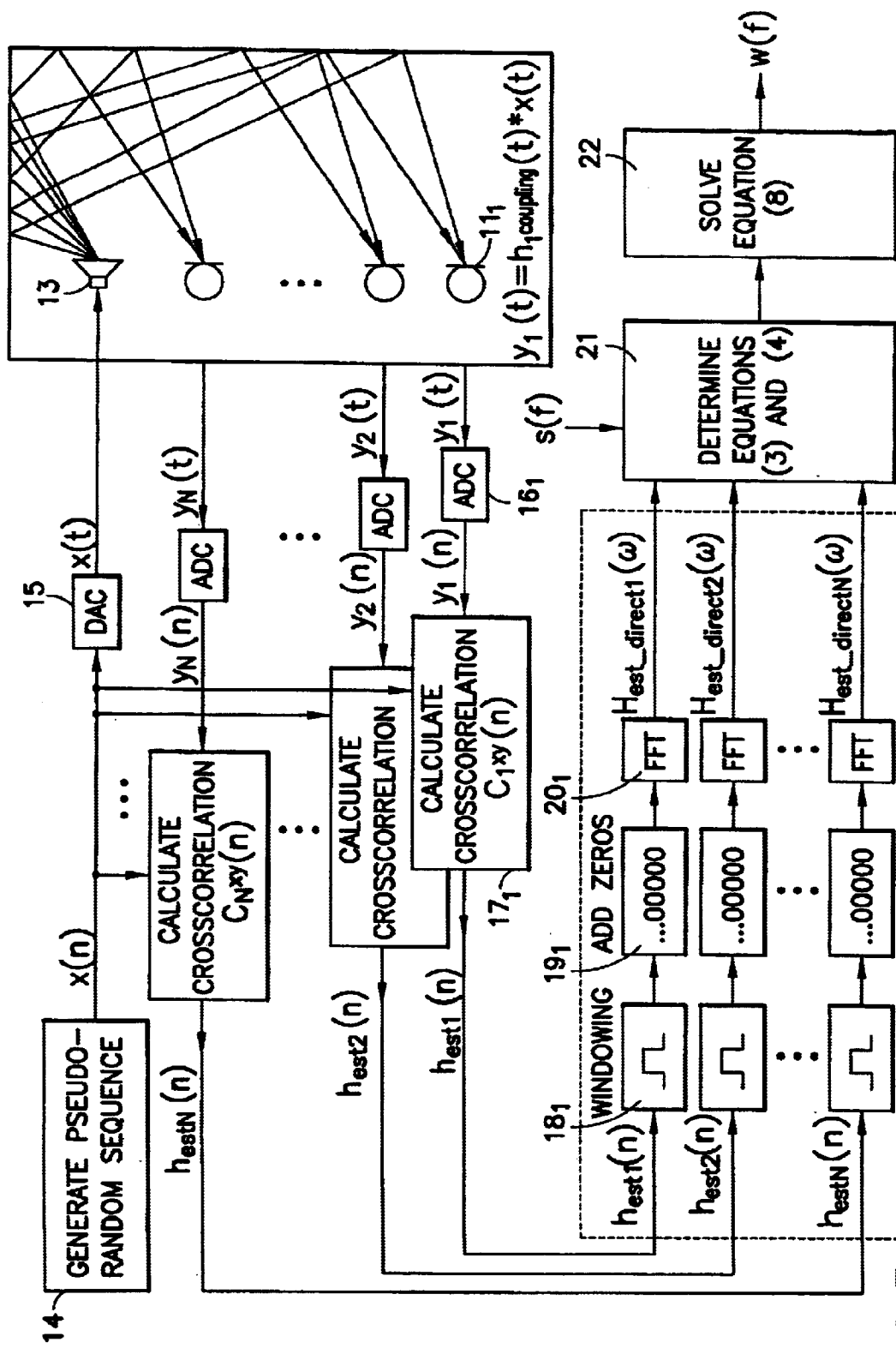
FIG. 5 is a block diagram showing an implementation of the method of the invention.

Implementing the method of the invention with the echo reduction apparatus and the sound playback device is shown in greater detail with reference to FIGS. 4 and 5.

After the TV monitor 12 has been switched on together with the box 6, a measurement signal x(n) generated by a generator 14 is converted into an analog signal by a digital-to-analog converter 15. The output x(t) from the converter 15 is transmitted separately to each of the loudspeakers 13 of the TV monitor 12. In this example, the generator 14 generates a pseudo-random maximum length sequence (MLS). The signal $y_m(t)$ from each microphone $11_m$ constituting the acoustic antenna is digitized by an analog-to-digital converter $16_m$ so as to take the form of a digital signal $y_m(n)$.

The estimated impulse response $h_{estm}(n)$ of each loudspeaker/microphone sound channel m, m=1, 2, . . . , N where N=11, is determined from the signal $t_m(n)$ by a calculator unit $17_m$ performing calculations that form part of the state of the art. When the measurement signal x(t) is an MLS, the estimated impulse response $h_{estm}(n)$ can be determined by cross-correlation making use in particular of a Hadamard transform.

Time windowing $18_m$ is performed on the estimated impulse response $h_{estm}(n)$ for each loudspeaker/microphone sound channel so as to take account only of the direct path plus a small number of early reflections designated respectively below by the terms "direct coupling" and "semi-direct coupling". Thus, this reduction in coupling relies on the more stable elements of the coupling (direct sound path and initial reflections on fixed obstacles, e.g. nearby walls) and ignores those portions of the coupling elements which are liable to change quickly in time (for example because of speakers moving and moving about). For this purpose, the short-term maximum of the impulse response of the central microphone is sought, and the number $n_0$ of the corresponding sample is identified. For each impulse response, a fast Fourier transform (FFT) is implemented over a time zone defined by an analysis window centered on the sample $n_0$.

When a plurality of coupling constraints are taken into account, there are as many analysis windows as there are coupling constraints. The analysis window can be rectangular; nevertheless other shapes of window such as a Hamming window, etc. can advantageously be used. The size of the analysis window is selected to be short, typically of the order of 64 to 256 samples, i.e. 4 milliseconds (ms) to 16 ms for sampling at a frequency $f_e$=16 kHz. It is thus necessary to add 19$_m$ zeros after the analysis window to improve frequency resolution prior to performing the FFT at 20$_m$. The result of the FFT is the complex transfer function $H_{est-directm}(\omega)$ corresponding to each loudspeaker/microphone m acoustic channel of the antenna after time weighting emphasizing direct and/or semi-direct coupling.

The channel-forming weighting coefficients w(f) are calculated at 21, 22 on the basis of these various transfer functions using the method of optimizing the near field directivity factor as described with reference to FIG. 1. The matrix M(f) of equation (4) contains the previously obtained complex coupling transfer functions, these functions corresponding to the measured propagation vectors. The optimum solution is calculated using equation (8) in which the matrix C(f) contains both the theoretical propagation vectors of the free field type, i.e. the far field constraints for the useful sources, and the measured propagation vectors. The constraint vector s(f) typically contains pure delays representing constraint (3) on useful speakers, and zeros for the coupling constraint in accordance with equation (4).

The following digital data given by way of example was taken from measurements performed on recordings made in a room by means of an echo reduction apparatus 6 operating with an acoustic system 7 of the kind shown in FIG. 4. The method of the invention was implemented at frequencies at or below 1400 Hz. The frequency analyses were performed on a 256-point window extended to 1024 points by adding zeros as described above. The calculated channel filters were of the 152-coefficient finite-duration impulse response (FIR) type, thus making it possible to obtain a satisfactory approximation to the desired filter characteristic.

A first series of measurements taken as a reference relate to the impulse response obtained at the output from the channel-forming and corresponding to maximization without constraint on the far field directivity factor. A second series of measurements relates to the impulse response obtained at the output from the channel-forming as calculated after taking account of a single constraint on direct coupling. A third series of measurements relates to the impulse response obtained at the output from channel-forming as calculated after taking account of two constraints on coupling by means of two analysis windows: the first being centered on the direct waves and the second being offset relative to the first so as to be centered on an early reflection.

Comparing the impulse responses obtained by applying two constraints or one constraint on direct coupling, with the impulse response obtained by maximization without constraint on the far field directivity factor shows the reduction in the coupling effect. This reduction is measurable mainly on the beginning of the impulse response, even though attenuation of the impulse response continues beyond that. The method of the invention makes it possible not only to attenuate the direct coupling effect, but it is also effective in attenuating the overall coupling effect. Frequency analysis shows that the echo reduction obtained by means of two constraints is of the order of 6 dB or 8 dB for frequencies below 250 Hz.

An examination of the echograms corresponding to the first series of measurements and to the third series of measurements confirms significant attenuation in the level of the direct wave, which can amount to as much as 20 dB. The trailing off at the end of the impulse response is also significantly reduced.

Emitting a maximum length sequence (MLS) when the system is switched on in order to measure the coupling impulse responses can provide an estimate that is robust even if the speakers begin talking at that time, since the MLS is decorrelated from the speech signal. Nevertheless, in order to ensure that the variance introduced in this way into the estimated transfer functions does not degrade the performance of the method, precautions can be taken such as rejecting a measurement if local speech is detected in the sound pickup, averaging a plurality of measurements, etc. Transfer function estimation is not very sensitive to speakers moving so long as they are not in the direct vicinity of the system since only direct or close coupling is analyzed. In addition, since processing is applied at low frequencies only, there is little chance of the transfer functions being modified significantly by an obstacle of small dimensions moving during the call.

It should be observed that the number of constraints possible, including constraints on far field gain, depend on the number of degrees of freedom available. The number of constraints that are exact (in both modulus and phase) is theoretically less than N−1, and the number of constraints that are partial (in modulus only or in phase only) is in theory less than 2N−1, where N is the number of microphones. It is necessary to limit the number of constraints since otherwise the directional properties of the antenna in the far field will be significantly degraded. Nevertheless, if the number of constraints turns out to be greater, the optimization problem cannot be solved exactly and it is appropriate to minimize the quadratic error between the vector C(f)w(f) and the desired constraint vector s(f).

Appendix 1

Directivity

A sensor is characterized by its directivity in three dimensions which is usually measured in two orthogonal planes and represented in polar coordinates (r, $\phi$, $\theta$) in the form of two radiation patterns. When the sensor is circularly symmetrical about an axis, directivity measured in a plane containing the axis is then said to be in elevation. Directivity measured in a plane orthogonal thereto is said to be azimuth directivity. As a general rule, elevation directivity is measured only in a plane containing the maximum of the azimuth directivity. Directivity gives an image of the signal picked up by the sensor for a point sound source situated in a direction ($\phi$, $\theta$) and at a distance r from the center of the sensor.

The microphones used in airborne acoustics generally present circular symmetry about their reference axis. By definition, a microphone is said to be:

omnidirectional if its sensitivity is independent of the direction of incidence of the soundwave;

bidirectional of order n if its sensitivity can be written in the form:

$$|M(\omega,\phi)| = A(\omega)\cos^n\phi \quad (9)$$

where $A(\omega)$ is a variable function of frequency and n is a positive integer; or unidirectional of order n if its sensitivity can be written in the form:

$$|M(\omega,\phi)| = A(\omega)\left[\frac{1+\beta\cos\phi}{1+\beta}\right]\cos^{n-1}\phi \quad (10)$$

with β being a positive constant referred to as the cardioid constant. When β=1, the directivity is cardioid, when β=√3, the directivity is supercardiod, and when β=3 the directivity is hypercardiod.

Antennas are generally constituted by discrete microphones. The N microphones that are spaced apart from one another at a distance d pick up the pressure in a localized volume and thus perform spatial sampling of the sound field. The behavior of such discrete antennas can be analyzed by analogy with digitizing signals that are sampled over a period T:

T⇔d or indeed T⇔$\vec{d}$ for the spatial case.

The excitation function which represents the pressure field received by the microphones, for a sound antenna whose sensors have the same sensitivity and the same weighting coefficients, is written in the following form:

$$i_n(x) = \frac{1}{N}\sum_{n=-\frac{N-1}{2}}^{\frac{N-1}{2}} \delta(x-nd) \quad (11)$$

By proceeding with the spatial Fourier transform, it is possible to deduce the spatial spectrum of the antenna $\Omega(u/\lambda)$:

$$\Omega(u/\lambda) = \int_{-\infty}^{+\infty} i_n(x)e^{-j2\pi n\frac{u}{\lambda}}dx = \sum_{n=-\frac{N-1}{2}}^{\frac{N-1}{2}} e^{-j2\pi nd\frac{u}{\lambda}} \quad (12)$$

Another interpretation of this formal expression can be obtained by considering the antenna as a spatial sampler truncated by a rectangular window. Consequently, the excitation function can be written in the form:

$$i_n(x) = \frac{1}{N}\text{rect}L(x)\sum_{n=-\infty}^{\infty} \delta(x-nd) \text{ with } L = Nd \text{ and} \quad (13)$$

$$\text{rect}L(x) = \begin{cases} 1 & \text{if } -L/2 \le x \le L/2 \\ 0 & \text{if } x < -L/2 \text{ or } x > L/2 \end{cases}$$

L corresponds to the "effective" length of the antenna which differs from its physical length $L_p=(N-1)d$.

The spatial spectrum of the antenna is written below in the form of a convolution product:

$$\Omega(u/\lambda) = TF\{i_n(x)\} = \frac{1}{N}TF\{\text{rect}L(x)\} * TF\left\{\sum_{n=-\infty}^{\infty} \delta(x-nd)\right\} \quad (14)$$

The first term leads to a cardinal sine (corresponding to the spatial spectrum of a continuous antenna):

$$TF\{\text{rect}L(x)\} = \frac{\sin(\pi Lu/\lambda)}{\pi Lu/\lambda} \quad (15)$$

The second term has the following expression:

$$TF\left\{\sum_{n=-\infty}^{\infty} \delta(x-nd)\right\} = \sum_{m=-\infty}^{\infty} \delta\left(u-\frac{m\lambda}{d}\right) \quad (16)$$

The Fourier transform of a train of pulses that are uniformly spaced apart by d in space also leads to a train of equidistant pulses spaced apart by λ/d in the spatial frequency domain.

The convolution of equation (15) with equation (16) thus enables the directional radiation pattern $\Omega(u)$ of the antenna to be obtained:

$$\Omega(u/\lambda) = \frac{1}{N}\frac{\sin(\pi Lu/\lambda)}{\pi Lu/\lambda} * \sum_{m=-\infty}^{\infty}\delta\left(u-\frac{m\lambda}{d}\right) \quad (17)$$

$$= \frac{1}{N}\sum_{m=-\infty}^{\infty}\frac{\sin\left[(\pi L)\left(\frac{u}{\lambda}-\frac{m}{d}\right)\right]}{(\pi L)\left(\frac{u}{\lambda}-\frac{m}{d}\right)}$$

The polar diagram corresponds to the sum of the cardinal sines offset by an interval λ/d. The first maximum centered on u=0 corresponds to the main lobe of the antenna and it is of width λ/L. The appearance of the pattern of the function TF{rectL(x)} enables the following conclusions to be drawn:

the directivity of the antenna increases with increasing length L;

by definition, the so-called "visible portion" of the spatial frequency range is defined by $-1 \le u \le 1$. If the inter-sensor distance becomes too large compared with the wavelength, a second lobe appears in the visible range: this is spatial aliasing. This phenomenon is entirely analogous to spectrum folding in the time-frequency domain when Shannon's theory is not complied with; and if d is small enough, then the directivity pattern of the discrete antenna is very close to that of a continuous antenna.

Directly calculating the function given by expression (12) when normalized (observing that it constitutes a geometrical progression) leads to a phase shift close to the expression:

$$\Omega(u/\lambda) = \frac{\sin(\pi uNd/\lambda)}{N\sin(\pi ud/\lambda)} \quad (18)$$

This expression is very close to that obtained for a continuous antenna when d<<λ/2.

The consequence of making the antenna out of discrete elements is to make the directivity pattern of the continuous antenna periodic, and thus imposes a limitation at high frequencies because of the presence of spatial aliasing.

Directivity Factor

To take account of the directional properties of a microphone, one method consists in defining its directivity factor, which characterizes the ability of a microphone to be more sensitive to a wave perpendicular to the reference axis (the aiming direction) travelling towards the front face of the microphone than to the set of waves that can arrive from all directions in space. The directivity factor is expressed as the ratio of the square of the voltage output by the microphone for a wave arriving on its axis divided by the mean of the squares of the voltages produced by the waves having the same route mean square (rms) pressure and at the same frequency coming from over a solid angle of 4π. It can thus also be expressed as the ratio of the square of the free field efficiency divided by the efficiency of the diffuse field. The diffuse field corresponds to the state of a field in which the mean energy per unit volume has the same value at all points and where the sound intensity is the same in all directions.

Far Field/Near Field

Let a linear antenna be of length L centered at x=O, extend along the abscissa axis x. Let there be a point S of coordinates $(x_0, y_0)$ such that the direction OS is at an angle φ with the abscissa axis. The signal received by the antenna placed in a sound field created by a source located at the point S corresponds to the set of the signals picked up by each of the individual receivers R(x,y) of the antenna. The electrical signal $s(x_0, y_0)$ picked up at the output of the antenna and associated with the presence of the source $S(x_0, y_0)$ has the following expression:

$$s(x_0, y_0) = K \int_{-L/2}^{L/2} \frac{i(x)e^{-jk|\vec{RS}|}}{|\vec{RS}|} dx \qquad k = \frac{\omega}{c} = \frac{2\pi}{\lambda} \qquad (19)$$

where K is a constant independent of x and where i(x) is the pressure field received by each individual receiver.

The distance ρ between the source $S(x_0, y_0)$ and each individual receiver R(x,y) of the antenna is written as follows:

$$\rho = |\vec{RS}| = \sqrt{|\vec{RO} + \vec{OS}|^2} \qquad (20)$$

$$= |\vec{OS}| \sqrt{1 + \left(\frac{|\vec{RO}|}{|\vec{OS}|}\right)^2 + 2\frac{\vec{RO} \cdot \vec{OS}}{|\vec{OS}|^2}}$$

When the source is far enough away from the origin compared with the size of the antenna ($|\vec{OS}|=\rho_0 \gg L$), then expression (20) can be developed in the form of a binomial series, retaining only the predominant terms:

$$|\vec{RS}| \approx \rho_0\left(1 + \frac{\vec{RO} \cdot \vec{OS}}{|\vec{OS}|^2} + \frac{1}{2}\frac{|\vec{RO}|^2}{|\vec{OS}|^2}\right) \qquad (21)$$

For sources in the far field ($\rho_0 \gg L$), the amplitude term present in the denominator of equation (19) can be replaced by the term $\rho_0$. It becomes:

$$s(x_0, y_0) = \frac{Ke^{-jk\rho_0}}{\rho_0} \int_{-L/2}^{L/2} i(x)e^{-jk\rho_0\left(\frac{\vec{RO} \cdot \vec{OS}}{|\vec{OS}|^2} + \frac{1}{2}\frac{RO^2}{OS^2}\right)} dx \qquad (22)$$

$$\approx \frac{Ke^{-jk\rho_0}}{\rho_0} \int_{-L/2}^{L/2} i(x)e^{-j\left(\vec{k}\cdot\vec{OR} + \frac{k}{2}\frac{RO^2}{OS}\right)} dx$$

Writing u=cos φ, it becomes the expression normalized relative to the axis of the directivity pattern of the linear antenna:

$$\Omega(k, u) = \int_{-L/2}^{L/2} i_n(x)e^{jk\left(xu - \frac{x^2}{2\rho_0}\right)} dx \qquad (23)$$

where $i_n$ corresponds to the pressure field which satisfies $|\Omega(k,0)|=1$.

The first term of the exponential under the integral represents the spatial Fourier integral. This is associated with the directivity pattern of the antenna in the far field. The second term is necessary to take account of the directional behavior of the antenna when the source is in the near field. This corrective term makes it possible to take account of the curvature of the wave front. By analogy with Kirchhoff-Fresnel diffraction theory, the first term of the above expression is thus analogous to the Fraunhofer zone (first order approximation in $x/\rho_0$). In addition, the limited size of the antenna can be interpreted as the effect of a perfectly anechoic virtual screen masking an antenna of infinite length and both Kirchhoff assumptions are consequently satisfied. It is therefore not surprising under such circumstances to observe a high degree of similarity in the results. Specifically, like diffraction theory which leads to the assertion that the diffraction pattern is the double Fourier transform of the aperture function, see the work by M. Bruneau, "Introduction aux théories de l'acoustique" [Introduction to acoustic theories], published by éditions Université du Maine, Le Mans, 1983, p. 370, the directivity pattern of the antenna is the spatial Fourier transform of the excitation function. This Fourier transform is one-dimensional if the antenna is rectilinear, two-dimensional if the antenna is planar, and three-dimensional when the antenna is three-dimensional. The general formula for the output from the antenna is as follows:

$$\Omega(\vec{k}, \omega) = \int\int_V\int i_n(\vec{x}, \omega)e^{-jk\vec{OR}} dV \qquad (24)$$

The second term of the exponential under the integral of expression (23) characterizes the Fresnel zone (second order approximation in $x/\rho_0$). Like radiation from an oscillating piston, if the excitation function (the acoustic pressure) remains constant along the antenna, for u=0, the contribution of the Fresnel integral can be expressed using Cornu's spiral, see the work by M. Bruneau, cited above, p. 301.

If the distance $\rho_0$ is large enough compared with the aperture L of the antenna, the expression (23) shows that the quadratic phase term has little influence in the integral. The minimum distance $\rho_0$ beyond which it is possible to take into consideration only the far field case can be obtained using Cornu's spiral when u=0, see the work by B. Steinberg, "Principles of aperture and array system design", Wiley-Interscience publications, John Wiley & Sons, New York, 1976. That work shows that for $\rho_0=L^2/2\lambda$, ignoring the second order term implies an error of less than 1 dB. The arbitrarily chosen value for separating the far field from the near field is then given by:

$$\rho_0 > L^2/\lambda \qquad (25)$$

It is important to observe that the boundary between the far field and the near field is directly associated with the size of the antenna and varies with the square of its length.

By way of example, for an antenna of length L=40 cm and $\rho_0$=3 m, condition (25) implies f<6300 Hz. Consequently, given the speech frequency band used when implementing the method of the invention, a speaker situated at such a distance is considered as being in the far field with respect to the directional behavior of a 40 cm antenna. The directivity pattern of such an antenna can thus reasonably be obtained by the spatial Fourier integral.

Under assumption (25), the complex directivity function $\Omega(u/\lambda)$ of the far field antenna obtained using the normalized equation becomes, for uniform excitation I along the antenna:

$$\Omega\left(\frac{u}{\lambda}\right) = \int_{-L/2}^{L/2} I e^{-j2\pi x \frac{u}{\lambda}} dx = \frac{\sin(\pi L u/\lambda)}{\pi L u/\lambda} \tag{26}$$

Superdirectional Antennas

A superdirectional antenna is an antenna for which the phase of the sensors has been shifted by more than the amount corresponding to the delay associated with the sound travel time between sensors. This procedure amounts to pointing the antenna towards an invisible region since the maximum of the main lobe is then outside the range $-1 \leq u \leq 1$.

For an "endfire" antenna, with the sensors at constant spacing, the delay applied to each sensor is of the form:

$$\tau_n = (1+\eta)\frac{nd}{c} = n\left(\frac{d}{c} + \tau_{sup}\right) \tag{27}$$

where $\eta$ is a positive constant giving the quantity of "oversteer". This procedure amounts to applying delays corresponding to a propagation speed $c/(1+\eta)$ that is slower than the speed of sound c. It can clearly be seen that such pointing enables the main lobe to be made narrower to the detriment of secondary lobes at a relatively higher level. In addition, oversteering can also give rise to aliasing lobes at lower frequencies giving rise to a more strict condition on d:

$$d < \frac{q\lambda_{min}}{2+\eta} \tag{28}$$

Since a portion of the useful energy lies in the invisible portion, sensitivity is reduced and incoherent noise reduction is degraded. Finally, in practice, theoretical optimal performance is difficult to achieve because of the high sensitivity of such synthesis to small imperfections in the system (mismatches between sensors, etc.). Errors concerning the amplitude or the phase of the signals are generally not correlated from one sensor to another and thus have an affect on channel-forming that is similar to incoherent noise. Estimating the reduction of incoherent noise thus constitutes a good indication of the degree of feasibility of such synthesis.

What is claimed is:

1. An echo reduction method, implemented with a multi-sensor sound pickup device forming an antenna (10) and a sound playback device (13), the method consists in submitting the output signals from the sensors ($11_m$) to complex weights w(f), said weights w(f) being calculated by maximizing (3) the directivity factor $F_d(f)$ under low frequency and near field constraints, where the expression for the directivity factor is as follows:

$$F_d(f) = \frac{1}{\frac{1}{4\pi} w^H(f) D_r(f) w(f)} \tag{1}$$

with $$D_r(f) = \int_{\theta=0}^{\pi} \int_{\varphi=0}^{2\pi} W(f, \varphi, \theta) H(f, r, \varphi, \theta) H^H(f, r, \varphi, \theta) \sin\theta d\theta d\varphi \tag{2}$$

the calculation being such that said weights w(f) satisfy (1) a linear first constraint on the modulus and the phase of the transfer function of the sound pickup device in given directions, the formulation of this first constraint at each frequency f being as follows:

$$C^H(f)w(f) = s(f) \tag{3}$$

said method being characterized in that in addition said weights w(f) are calculated in such a manner as to satisfy (2) a second constraint determined on the basis of in-situ measurements of complex transfer functions of sound channels defined by the inputs of the loudspeakers of the sound playback device and the outputs of the sensors making up the sound pickup device, this second constraint at each frequency f being formulated as follows:

$$M^H(f)w(f) = 0 \tag{4}$$

where formulas (1) and (4) are such that:

H is the propagation vector whose elements are the complex values of the free field transfer functions between a point source situated at the distance r from the center of the antenna in the direction defined by polar angles $\phi$ and $\theta$, and each sensor of the antenna, as calculated at the frequency f;

$D_r(f)$ is the directivity matrix which characterizes the spatial selectivity properties of the antenna at distance r;

$W(f, \phi, \theta)$ are spatial weights that enable waves coming from the loudspeaker directions to be attenuated to a greater extent in order to reduce direct coupling with the loudspeakers;

w(f) is a vector of complex weights for the output signals from the sensors at the frequency f;

C(f) is a "constraint" matrix containing the theoretical propagation vectors calculated on the basis of a free field type propagation model or as measured under free field conditions;

s(f) are the desired complex gains in the given directions;

M(f) is a coupling constraint matrix containing the complex transfer functions as measured in-situ of the sound channels defined by the inputs to the loudspeakers of the sound playback device and by the outputs from the sensors making up the sound pickup device, referred to as "sound coupling" channels; and 0 is a zero vector.

2. An echo reduction method according to claim 1, in which said weights w(f) also satisfy a non-linear constraint (4) fixing a limit for reducing incoherent noise at the output from the sound pickup device, the formulation of this non-linear constraint at each frequency f being as follows:

$$w(f)^H w(f) = \frac{1}{R_{I_{\min}}(f)} \quad (5)$$

in which formulation:

$R_{Imin}(f)$ is the desired minimum incoherent noise reduction, i.e. the ratio of incoherent noise energy at the output from the sound pickup device moralized by the number of sensors divided by the mean incoherent noise energy of a single sensor.

3. (Amended) An echo reduction method according to claim 1, in which said weights w(f) also satisfy constraints (5) on the aperture of the main lobe and on the reduction of aliasing lobes and secondary lobes, these said constraints being expressed in the form of a system of non-linear equations:

$$w^H(f)H_0(f)H_0^H(f)w(f) = g_0(f)$$
$$w^H(f)H_1(f)H_1^H(f)w(f) = g_1(f)$$
$$\vdots$$
$$w^H(f)H_k(f)H_k^H(f)w(f) = g_k(f)$$

in which system of equations:

$H_i$, i=0, ..., k represents the propagation vector between a point source in the far field in angular direction ($\phi_i$, $\theta_i$) and the sensors of the antenna; and $g_i$ is the gain desired in this direction.

4. An echo reduction method according to claim 1, in which time weighting is applied to at least a portion of the impulse responses of the sound coupling channels prior to applying constraint (4) so as to enhance the influence of those portions which correspond to direct and/or semi-direct coupling when determining the complex weight vector w.

5. An echo reduction method according to claim 1, in which the measurements of the characteristics of the sound coupling channels are formed by means of maximum length sequences applied to the inputs of the loudspeakers of the sound playback device (13) situated in the vicinity of the sound pickup device (8) when said sound pickup device (8) is switched on.

6. Echo reduction apparatus (6) for operating with a sound playback device (13) to implement a method according to claim 1, said apparatus comprising:

a multi-sensor sound pickup device (8) forming an antenna (10);

means (21) for calculating a first constraint, the formulation of this first constraint at each frequency f being as follows:

$$C^H(f)w(f)=s(f)$$

means (14–21) for calculating a second constraint, the formulation of this second constraint at each frequency f being the following:

$$M^H(f)w(f)=0$$

means (22) for calculating the following equation:

$$w(f)=D'_r{}^{-1}(f)C(f)(C^H(f)D'_r{}^{-1}(f)C(f))^{-1}s(f)$$

in which equation:

$$D_r'(f)=D_r(f)$$

and $$D_r(f) = \int_{\theta=0}^{\pi}\int_{\varphi=0}^{2\pi} W(f,\varphi,\theta)H(f,r,\varphi,\theta)H^H(f,r,\varphi,\theta)\sin\theta d\theta d\varphi$$

formulas (2), (3), (4), and (8) being such that:

w(f) is a vector of complex weights for the output signals from the sensors at the frequency f;

c(f) is a "constraint" matrix containing the theoretical propagation vectors calculated on the basis of a free field type propagation model or as measured under free field conditions;

s(f) are the desired complex gains in the given directions;

M(f) is a coupling constraint matrix containing the complex transfer functions as measured in-situ of the sound channels defined by the inputs to the loudspeakers of the sound playback device and by the outputs from the sensors making up the sound pickup device, referred to as "sound coupling" channels;

0 is a zero vector;

H is the propagation vector whose elements are the complex values of the free field transfer functions between a point source situated at the distance r from the center of the antenna in the direction defined by polar angles $\phi$ and $\theta$, and each sensor of the antenna, as calculated at the frequency f;

$D_r(f)$ is the directivity matrix which characterizes the spatial selectivity properties of the antenna at distance r; and W(f, $\phi$, $\theta$) are spatial weights that enable waves coming from the loudspeaker directions to be attenuated to a greater extent in order to reduce direct coupling with the loudspeakers.

7. Echo reduction apparatus (6) according to claim 6, further comprising means for calculating a non-linear constraint fixing a limit for incoherent noise reduction at the output from the sound pickup device, the formulation of this constraint at each frequency f being the following:

$$w(f)^H w(f) = \frac{1}{R_{I_{\min}}(f)} \quad (5)$$

in which formulation:

$R_{Imin}(f)$ is the desired minimum incoherent noise reduction, i.e. the ratio of incoherent noise energy at the output from the sound pickup device moralized by the number of sensors divided by the mean incoherent noise energy of a single sensor.

8. Echo reduction apparatus (6) according to claim 6, further comprising means for calculating constraints on the aperture of the main lobe and on the reduction of the aliasing lobes and the secondary lobes, these said constraints being expressed in the form of a system of non-linear equations:

$$w^H(f)H_0(f)H_0^H(f)w(f) = g_0(f)$$
$$w^H(f)H_1(f)H_1^H(f)w(f) = g_1(f)$$
$$\vdots$$
$$w^H(f)H_k(f)H_k^H(f)w(f) = g_k(f)$$

in which system of equations:

$H_i$, i=0, ..., k represents the propagation vector between a point source in the far field in angular direction ($\phi_i$, $\theta_i$) and the sensors of the antenna; and $g_i$ is the gain desired in this direction.

* * * * *